July 11, 1933.                H. C. RENTSCHLER                 1,917,854
                              PHOTO ELECTRIC TUBE
                            Filed May 6, 1929           2 Sheets-Sheet 1

INVENTOR
H.C. RENTSCHLER
BY
ATTORNEY

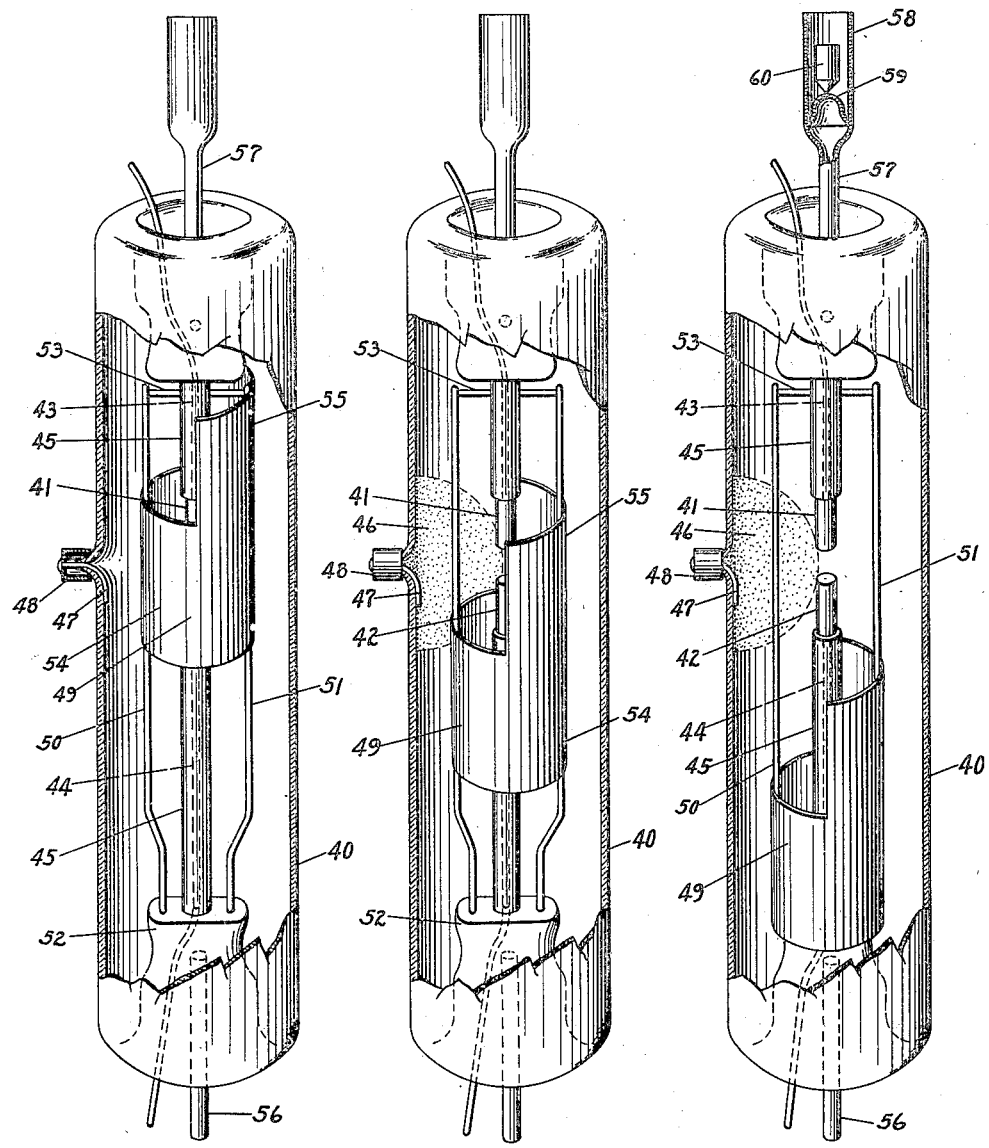

Patented July 11, 1933

1,917,854

UNITED STATES PATENT OFFICE

HARVEY CLAYTON RENTSCHLER, OF EAST ORANGE, NEW JERSEY, ASSIGNOR TO WESTINGHOUSE LAMP COMPANY, A CORPORATION OF PENNSYLVANIA

PHOTOELECTRIC TUBE

Application filed May 6, 1929. Serial No. 360,666.

This invention relates to a photo-electric tube and more particularly to a tube which is sensitive only in the ultra-violet region of the spectrum.

In a copending application Serial No. 360,667, filed May 6, 1929, I have described and claimed a photo-electric tube in which the sensitivity starts in the blue region of the spectrum and extends into the ultra-violet region.

An object of the present invention is to produce a photo-electric tube which is substantially non-sensitive to the entire visible spectrum and in which the photo-electric effect starts in the upper region of the ultra-violet and extends through the entire ultra-violet region or to limited portions thereon.

Another object is to produce a photo-electric tube which is sensitive only to ultra-violet light having a wave length below about 3900 Angstrom units and in which the photo-electric effect will be strong.

A further object is to provide an improved method of producing a photo-sensitive electrode.

Other objects and advantages will appear as the description of the invention proceeds.

Heretofore, in the production of photo-electric tubes for measuring radiations in the ultra-violet region, cadmium or zinc have been generally used as the photo-sensitive cathode but the photo-electric current obtained from cadmium is extremely feeble, requiring for its detection a sensitive electroscope or electrometer or special vacuum tube amplifying means.

In accordance with my invention, I have produced a photo-electric tube which is sensitive only to ultra-violet light and in which the photo-electric effect is strong, being of the same order of magnitude as that obtained by the alkali metals in the visible region of the spectrum.

I have discovered that the metal thorium, when thoroughly cleaned and treated in accordance with a definite schedule exhibits a "normal" photo-electric effect which starts at about the border of the visible and ultra-violet region of the spectrum and extends into the ultra-violet region, the material being substantially non-sensitive to light within the visible region. When thorium so treated is employed as the cathode of a photo-electric tube extreme sensitivity is obtained exclusively to light in the region of the spectrum below about 3900 Angstrom units.

If it is desired to measure a broad band of the ultra-violet region the envelope or a portion of, the envelope of the tube may be composed of a material, such as quartz, whereas if it is desired to restrict the measurement to a narrow band the envelope may be composed of a glass which is transparent only to light in the upper region of the ultra-violet. Thus for instance for erythema treatment, the range of useful rays is restricted to a narrow band each side of about 2900 Angstrom units and therefore, in the production of a dosimeter employing a photo-electric tube for determining the length of treatment from a given source of ultra-violet light, it is necessary that the tube be sensitive to light principally in the region between about 2700 and 3100 Angstrom units.

By employing an envelope for the tube which is opaque to rays of short wave length, such as Corex, the tube may have a maximum sensitivity at about 2900 Angstrom units, and only a low order of sensitivity at wave lengths appreciably above and below this value. The percent transmision of the envelope for various wave lengths may be varied by changing the thickness of a glass of definite composition and in this manner the peak of the output curve of the tube may, to a limited extent, be varied.

I have found, that by employing very thin glass windows for the tube, there is a very great increase in the current output of the tube, particularly to light of lower wave lengths. When employing windows of Pyrex, which ordinarily is not considered transparent to ultra-violet light, of a thickness of about .01 inches or less, the ultra-violet transmission of the glass is comparable with that of quartz, at the thickness ordinarily employed except for the short wave length end of the spectrum.

In producing a photo-electric tube, in accordance with my invention I preferably employ thorium for both the anode and cathode although it is to be understood that the anode may be composed of another metal, such as nickel. The cathode may consist of a sheet of thorium or it may take the form of a thin deposit on the wall of the envelope, in contact with a leading-in conductor. When employed as a coating on the glass envelope, I prefer to first coat the glass, over the portion which is to constitute the cathode, with a noble metal, such as gold, in order to obtain a better contact with the cathode leading-in wire.

In order to render the thorium cathode active it is essential to thoroughly clean the surface of all impurities, oxides, etc. This can be conveniently accomplished when employing a solid cathode by creating a glow discharge in an inert gas between the anode and cathode to sputter away the impurities while protecting the envelope from a darkening deposit of the vaporized or sputtered material.

The construction of the tube and the method of treating and producing the active cathode surface will appear more fully in connection with a detailed description of the accompanying drawings in which Fig. 1 is a perspective view, with the envelopes partly broken away, of a photo-electric tube embodying my invention.

Figs. 5, 6 and 7 are elevation views, partly in section of a tube having the cathode deposited on the wall of the envelope, and showing the progressive stages in the formation of the cathode.

Figure 1:
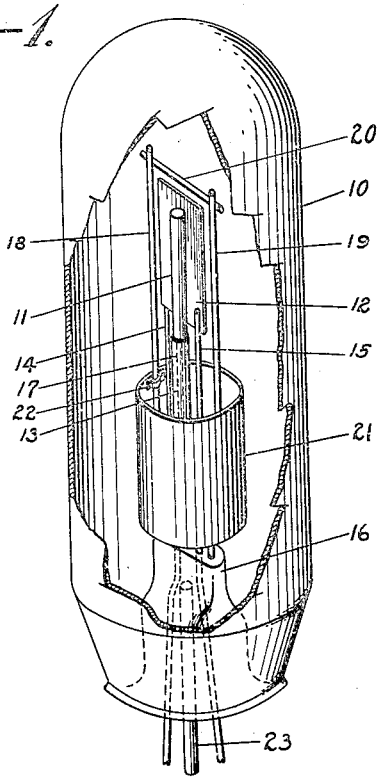

Referring to Fig. 1, I have shown a photo-electric tube comprising an envelope 10 composed of a material which is transparent to ultra-violet light, such as quartz or special ultra-violet transmitting glasses, as Corex, Vitaglass, etc. Within the envelope 10 is mounted a rod shaped anode 11 and a plate shaped cathode 12 both of which are preferably composed of thorium. The anode 11 is mounted upon a leading-in conductor 13 and the cathode 12 is supported on two spaced rigid wires 14 and 15, the latter of which, together with the lead wire 13, is sealed through the press 16 of the tube. An insulating tube 17 of quartz, glass, porcelain or similar material surrounds the leading-in wire 13 and restricts the active area thereof to the end portion 11. The supports 14 and 15 may be similarly protected, if desired.

A frame-work, consisting of two parallel longitudinally extending wires 18 and 19 and a bracing cross wire 20, is mounted above the press 16, and supported on the frame-work is a cylindrical shield 21 having on its inner surface, straps or eyelets 22 through which the vertical wires 18 and 19 have sliding engagement. By inverting the tube the shield 21 may be moved from one end of the frame to the other. The function of the shield 21 is to protect the walls of the envelope from vaporized or sputtered electrode material during treating-out of the electrodes.

In the manufacture of the tube, after the electrode assembly has been sealed into the envelope, the envelope is baked-out and exhausted in the usual manner and the shield 21 degasified by high frequency induction heating. A filling of a gaseous medium, such as argon, neon or helium, is then introduced into the envelope, through the exhaust tubing 23. Argon gas at a pressure of from about 1 to 6 mm. is satisfactory. The tube is then inverted to position the shield 21 about the electrodes 11 and 12, and a glow discharge is created between the electrodes of sufficient current density to effect a considerable sputtering of the electrode material.

If a direct current discharge is employed the cathode 12 of the photo-electric tube should serve as the anode for the glow discharge. The discharge should be continued until the electrodes are entirely clean. I usually continue the discharge for about two hours. The sputtered material collects on the interior of the shield 21 and the envelope is maintained clear and free from light obscuring deposits. After the cathode is thoroughly cleaned, the shield 21 is moved to the position shown in Fig. 1.

If a gas filling is desired within the tube, the tube may be employed immediately following the glow discharge otherwise the gas must be pumped out completely, as will be described in connection with Figures 5, 6 and 7.

Figure 2:
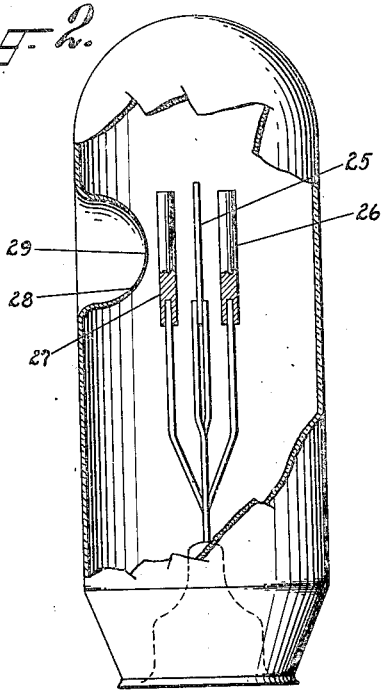
Fig. 2 is an elevation, partly in section, of a modified form of tube, employing two anodes.

In Fig. 2 I have shown a photo-electric tube having a plate shaped thorium cathode 25 disposed between two rod shaped anodes 26 and 27. Opposite one side of the cathode 25 is a window 28 formed by heating up the glass wall of the envelope and drawing in a bulbous portion having a thin dome 29 and gradually tapering walls. The thickness of the window may be about .01 inches although windows of a diameter of about 1 inch and a thickness of only .0001 inches will withstand full atmospheric pressure. The thin window is very much more transparent to ultra-violet light than the remainder of the envelope. Thus, for instance, with an envelope, as shown in Fig. 2, composed of an ultra-violet transmitting glass, such as Corex having a thickness of about one-thirty second of an inch and a window of a thickness of about .01 inches, the current output of the tube when subjected to the light from a mercury arc, was several times greater when the window-side of the tube was directed towards light source than when the opposite side was directed thereto. This increase in current was due to the lesser absorption of the ultra-violet light of short wave lengths in the thin window, than in the glass of full wall thickness.

Figure 3:
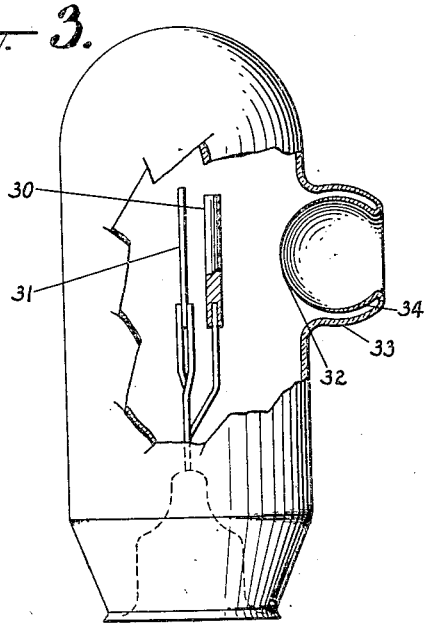
Fig. 3 is an elevation, partly in section of a tube employing a thin vitreous window in the envelope.

In Fig. 3 I have shown a tube having a single anode 30 and thorium plate cathode 31 and employing a different window construction. In this construction the window 32 is formed by first blowing out a bulbous enlargement 33 on the side of the envelope, and heating up the dense portion thereof and drawing the same in to form the inner reentrant bulbous window 34 having a very thin dome 32.

This window has the advantage that the dome portion is of more uniform thickness over a larger area due to the more gradual taper of the thickness of the walls. This construction also facilitates the formation of very thin windows.

A thin window of the form shown in Figs. 2 and 3, when formed in envelopes of glass ordinarily deemed opaque to ultra-violet light, such as ordinary lime glass or Pyrex, readily transmit ultra-violet light so that it is unnecessary to employ expensive special ultra-violet transmitting glasses or quartz envelopes unless very short ultra-violet rays are to be used.

It is to be understood, in connection with Figs. 2 and 3 that the thorium cathode is treated out as described in connection with Fig. 1, while protecting the walls of the envelope, as by the shield 21. For convenience the shield 21 has not been illustrated in Figs. 2 and 3.

Figure 4:
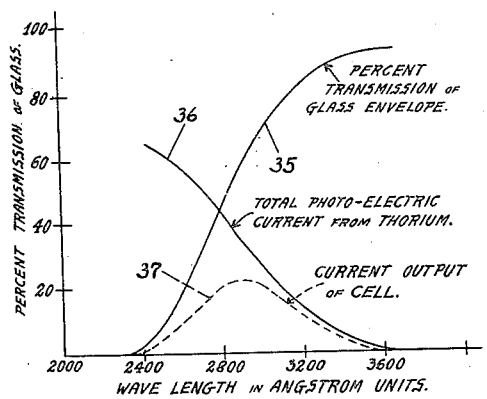
Fig. 4 is a curve showing the current output of a tube plotted against the wave length of the incident ultra violet light.

Fig. 4 shows the relation between the wave length of the incident light and the current output of a tube employing an envelope which absorbs the ultra-violet light of short wave lengths so as to render the tube sensitive only to a restricted band of frequencies in the region most desired for erythema treatment. Curve 35 designates approximately the relationship of the per cent transmission of the ultra-violet radiations through the wall of the envelope, curve 36 the total current or photo-electric sensitivity of the thorium cathode, assuming no absorption of radiations in the envelope and curve 37 is a resultant curve indicating the effect of the energy absorption of the glass (curve 35) on the current output (curve 36) on the tube.

The form of the curve 35 will vary somewhat with different glass compositions and may be modified by employing glass of different thicknesses so that the effect of the absorption of the ultra-violet radiations in the glass, on the output of the tube may be modified. With the form of curves shown, the maximum sensitivity of the tube occurs at about 2900 Angstrom units which is in the narrow region of the spectrum most suitable for erythema production.

The peak of the curve 37 may be shifted to the left by using a thinner envelope and thus decreasing the absorption of the lower wave length radiations or it may be shifted to the right to narrow up the band to which the tube is sensitive by increasing the thickness of the envelope.

In Figs. 5, 6 and 7 I have shown a photoelectric tube in which the cathode consists of a deposit of clean thorium on a wall of the envelope. The tube comprises an envelope 40 having anodes 41 and 42, preferably composed of thorium, projecting therein from opposite ends thereof. The anodes 41 and 42 are mounted on rigid leading-in wires 43 and 44 sealed through the ends of the envelope and surrounded by insulating sleeves 45. It is to be understood however, that if desired the anodes may both be mounted on a single stem. A cathode 46 is provided in the form of a thin deposit of thorium on a wall of the tube in contact with a leading-in conductor 47 sealed through the envelope and connected to an external terminal 48.

Preferably the envelope, adjacent the leading-in wire 47, is coated with a layer of a noble metal, such as gold, prior to the formation of the thorium deposit, in order to produce a good electrical contact between the cathode and the cathode leading-in wire.

This gold coating may be applied by painting the envelope with liquid bright gold, drying the coating for a few minutes at about 150° C. and then baking for 10 to 15 minutes at a temperature of about 500° C. During the baking, a stream of air should be maintained through the envelope to carry away the volatilized material given off from the coating.

A tubular metal shield 49 is mounted within the envelope so that it may be moved from one end thereof to the other and thus occupy the positions shown in Figs. 5, 6 or 7 respectively. The shield 49 is mounted upon a frame consisting of two parallel longitudinally extending wires 50 and 51 sealed into the press 52, and a cross bracing member 53.

The shield 49 comprises a lower cylindrical portion 54 and an upper semi-cylindrical portion 55 arranged so that when the shield is in the upper position, shown in Fig. 5, the electrodes 41 and 42 are entirely enclosed within the cylindrical portion 54 of the shield. In this position of the shield the thorium electrodes are cleaned by creating a glow discharge therebetween in a gaseous filling of one of the monatomic gases. After the anodes have both been thoroughly cleansed, and the vaporized and sputtered impurities collected on the interior of the shield, the shield is moved to the position shown in Fig. 6 and the glow discharge continued to sputter a quantity of the thorium over to one side of the envelope to form the cathode surface 46. The remainder of the envelope is protected during this operation by the semi-cylindrical portion 55 of the shield so that there will be a clear window for the light opposite the cathode. The shield is then moved to the lower position shown in Fig. 7 to enable the tube to be used.

It will be understood that prior to cleaning the electrodes and forming the cathode surface, the envelope is baked out and exhausted through the exhaust tubing 56, the gas filling inserted and the tube sealed off. If it is desired to operate the tube with a gas filling, the gas employed for supporting the glow discharge is left within the envelope. However, if a vacuum tube is desired, the gas must be removed. This can be conveniently accomplished by the auxiliary exhaust tube 57 disposed at the opposite end of the tube from the exhaust tubing 56.

The exhaust tubing 57 has an enlargement 58 across which a thin glass bulbous partition 59 extends, sealing the lower portion of the tube against the atmosphere. When it is desired to evacuate the gas filling, an iron plunger 60 is inserted in the tubing above the partition 59 and the end 58 connected to an exhaust system. After the air has been removed from the system above the partition 59, the iron plunger 60 is raised by an external magnet and allowed to fall so as to puncture the partition and connect the interior of the envelope to the exhaust system. An arrangement of this nature is necessary in evacuating the monatomic gas in order to prevent the entrance of air into the envelope after the formation of the cathode, since exposure of the thorium to the atmosphere even momentarily impairs or destroys its sensitivity.

In the operation of the tube, the anodes 41 and 42 may be employed together as a single anode or one only of the anodes may be used, the main purpose of including the two anodes in the envelope being to enable one of them to serve as a cathode for the other, during the cleaning of the anode and the formation of the cathode film on the envelope.

While I have shown several embodiments of my invention it is to be understood that the invention is not limited to such specific embodiments but is susceptible of many changes and modifications and such embodiments are to be considered merely as illustrative of the invention and not in a limiting sense, except in accordance with the appended claims.

What is claimed is:

1. A photo electric tube comprising an envelope, an anode and a cathode therein, said cathode being composed of thorium and a window in said envelope opposite said cathode more transparent to ultra-violet light than the remainder of the envelope.

2. A photo electric tube comprising an envelope having an anode and a cathode therein, said cathode being composed of thorium and said envelope, opposite said cathode, being transparent to ultra-violet light of a wave length above about 2400 Angstrom units but having a low per cent transmission of radiations of a wave length shorter than about 2400 Angstrom units.

3. The method of making a photo electric tube having an envelope containing a thorium cathode and an anode comprising creating a glow discharge between said cathode and anode in a gaseous atmosphere to sputter away the surface portion of the cathode and protecting a portion of the walls of the envelope from said sputtered material.

4. The method of making a photo electric tube having an envelope containing a plurality of electrodes at least one of which is composed of thorium, comprising introducing a gas into the envelope, creating a discharge between the electrodes with the thorium electrode as anode and protecting a portion of the walls from material sputtered from the electrodes.

5. The method of making a photo electric tube having an envelope containing a plurality of electrodes, at least one of which is composed of thorium, comprising introducing a gas into the envelope, creating a discharge between said electrodes with the thorium electrode serving as an anode, protecting a portion of the walls of the tube from material sputtered from the electrodes and subsequently sputtering a quantity of the thorium onto a wall of the envelope.

6. The method of making a photo sensitive electrode in a photo electric tube having an envelope containing a plurality of electrodes, at least one of which is composed of material adapted to become photo-sensitive, comprising introducing a gas into the envelope, and creating a glow discharge between said electrodes and continuing said discharge until the surface impurities are sputtered from said electrode.

7. The method of producing a photo sensitive electrode in an envelope containing a plurality of electrodes comprising introducing an inert gas into said envelope and establishing a glow discharge between said electrodes.

8. The method for producing a photo sensitive electrode in an envelope containing a plurality of electrodes comprising introducing an inert gas into said envelope, establishing a glow discharge between said electrodes and collecting the material sputtered during the glow discharge action.

9. The method for producing a photo sensitive electrode in an envelope containing a plurality of electrodes comprising introducing an inert gas, at a pressure of about 1 to 6 millimeters of mercury, into said envelope and creating a glow discharge between said electrodes.

10. A photo-electric tube comprising an envelope, an anode and a photo-sensitive cathode therein, said envelope being composed of a vitreous material and including a body portion and a window portion, said body portion and window portion being of the same composition and being homogeneously united with each other, said window portion being disposed opposite said cathode, said body portion having a thickness that is materially greater than that of said window portion whereby the permeability of said window portion to radiations of about 2600 Angstrom units is at least two times as great as the permeability of said body portion to radiations of the same wave length.

11. A photo-electric tube comprising an envelope, an anode and a photo-sensitive cathode therein, said envelope being composed of a vitreous material and including a body portion and a window portion, said window portion being disposed opposite said cathode, said body portion and window portion being of the same composition and being homogeneously united with each other, said body portion having a thickness that is greater than that of said window portion, said window portion being bulbous in form and having a dome whose thickness is between about 0.0001 and 0.01 of an inch whereby at least fifty percent of the radiations of about 2600 Angstrom units impinging upon said window at the dome portion thereof may pass therethrough but no more than about two percent of radiations of the same wave length impinging upon said body portion will pass therethrough.

12. A photo-electric tube comprising an envelope, an anode and a photo-sensitive cathode therein, said envelope having a portion thereof permeable to radiation of certain frequencies and another portion, said other portion being thinner than said first mentioned portion and having a permeability to said radiations of said certain frequencies which is greater than that of said first portion.

13. A photo-electric tube comprising an envelope, an anode and a photo-sensitive cathode therein, said envelope having a portion thereof permeable to radiation of certain frequencies and another portion, said other portion being thinner than said first mentioned portion and having a permeability factor to said radiation of said certain frequencies which is greater than that of said first portion, the composition of said two portions being the same, said two portions being homogeneously united with each other.

In testimony whereof, I have hereunto subscribed my name this 3rd day of May, 1929.

HARVEY CLAYTON RENTSCHLER.